United States Patent [19]

Riel et al.

[11] Patent Number: 5,041,528

[45] Date of Patent: * Aug. 20, 1991

[54] NEW DIMER FOR SYNTHESIS OF HIGH PERFORMANCE POLYMER MATRIX COMPOSITES

[75] Inventors: Frank J. Riel, San Diego; Tuyet Vuong, Elsinore; Edward A. Delaney, Spring Valley, all of Calif.

[73] Assignee: Rohr Industries, Inc., Chula Vista, Calif.

[ * ] Notice: The portion of the term of this patent subsequent to Aug. 20, 2008 has been disclaimed.

[21] Appl. No.: 385,659

[22] Filed: Jul. 25, 1989

[51] Int. Cl.$^5$ .......................... C08C 8/02; C08C 69/26

[52] U.S. Cl. .................................... 528/353; 528/125; 528/128

[58] Field of Search .......................... 528/353, 125, 128

[56] References Cited

U.S. PATENT DOCUMENTS 3,708,459  1/1973  Lubowitz ............................. 528/353

OTHER PUBLICATIONS

Federal Register, vol. 54, No. 91, 20715–20744 (May 12, 1989) Occupational Exposure to 4,4′Methylenedianiline (MDA); Proposed Rule.

National Institute for Occupational Safety and Health, Current Intelligence Bulletin 47 (Jul. 25, 1986), Publication No. 86–115.

National Toxicology Program Technical Report No. 360, Toxicology & Carcinogenesis Studies of N,N–Dimethylaniline.

Chemical & Engineering News; "Advanced Polymer Composites Tailored for Aerospace Use"; pp. 37–52; Jul. 23, 1990.

35th International SAMPE Symposium, "A New Addition Polyimide Having Improved Toxicity, Outlife and Processing Properties"; R. B. Baggett et al.; Apr. 2–5, 1990.

*Primary Examiner*—Morton Foelak
*Assistant Examiner*—P. Hampton-Hightower
*Attorney, Agent, or Firm*—Patrick J. Schlesinger

[57] ABSTRACT

An improved synthesis for PMR-type polyimides, including first preparing a dimer of 5-norbornene-2,3-dicarboxylic acid, or acid ester or anhydride and 4,4′methylenedianiline. This dimer is then reacted with the reaction product of the dimethyl ester (or dianhydride) of 3,3′, 4,4′-benzophenonetetracarboxylic acid and 4,4′-methylenedianiline. The resulting polyimide prepolymer exhibits superior physical properties and is substantially free of the undesired trimer of 5-norbornene-2,3-dicarboxylic acid, or acid ester or anhydride and 4,4′-methylenedianiline. When this dimer is reacted with 3,3′, 4,4′-benzophenonetetracarboxylic acid dianhydride methylenedianiline amic acid mixture, the resulting polyimide prepolymer exhibits superior physical properties.

15 Claims, No Drawings

NEW DIMER FOR SYNTHESIS OF HIGH PERFORMANCE POLYMER MATRIX COMPOSITES

CROSS-REFERENCE TO RELATED APPLICATION

This Application is a continuation-in-part Application of application No. 07/194,321, filed May 16th, 1988, the specification of which is incorporated herein by reference.

FIELD OF THE INVENTION

An improved synthesis for a class of high temperature polyimides known as PMR, useful in the production of high performance polymer matrix composites.

TECHNOLOGY REVIEW

The application of polymer matrix composite materials was expanded by the development of a class of polyimides known as PMR, for in situ Polymerization of Monomer Reactants. Polymer matrix composite materials may be produced from PMR polyimides by impregnating the reinforcing fibers with a solution containing a mixture of monomers dissolved in a low boiling point solvent. The monomers are essentially unreactive at room temperature, but react in solution at elevated temperatures to form high temperature stable polyimide matrix. The preparation of PMR polyimides is described in U.S. Pat. No. 3,745,149 by T. Serafini, et al.

Four thermal transitions occur during the overall cure of a PMR polyimide. The first and third transitions are endothermic and are related to the following: (1) melting of the monomer reactant mixture below 100° C., (2) in situ reaction of the monomers at about 140° C. to form norbornene terminated prepolymers, and (3) melting of the norbornene terminated prepolymers in the range of 175 to 250° C. The second transition (mentioned above) and the fourth transition, centered near 340° C., are exothermic. The fourth transition is associated with the addition cross-linking reaction.

A known PMR material is designated PMR-15. PMR-15 consists of a methanol solution of the monomethyl ester of 5-norbornene-2,3-dicarboxylic acid (NE), the dimethyl ester of 3,3',4,4'-benzophenonetetracarboxylic acid (BTDE), and 4,4'-methylenedianiline (MDA). However, it was reported in 1985 that aged PMR-15 resin solutions have poor physical properties, especially high temperature aging characteristics. See Lindenmeyer, et al. *Characterization of PMR Polyimide Resin and Prepreg* (NASA Contractor Report, NASA CR-168217). These authors report that their investigation has shown that PMR-15 resin solutions may be characterized by HPLC methods, and that final composite properties depend primarily upon the amount of unreacted NE present in the prepreg prior to cure. At relatively low temperatures the NE and MDA appear to undergo a reaction that adversely affects the physical properties (especially the high temperature aging characteristics) of the resulting composites. The most likely reaction products of such a combination, the mono and bisimide, could not be confirmed as existing in the aged prepregs by these authors. Furthermore, the authors report that the deliberate addition of one of these materials, the monoimide, did not produce the same adverse effects on the aging characteristics.

MDA has been found to be a potential human carcinogen and hepatotoxin. In a Federal Register notice published May 12th, 1989 at 54 Fed.Reg. 20672 the Occupational Safety and Health Administration proposed a maximum permissible exposure limit of 10 parts of MDA per billion parts of air (10 ppb) averaged over an eight-hour day, plus a 100 ppb short term exposure limit over a 15-minute period. The current maximum permissible exposure for MDA is 100 ppb. Based on estimates of cancer risk the new standards are expected to prevent from about 2 to about 23 cancer deaths per year, and to reduce liver damage.

U.S. Pat. No. 3,697,345 to Vaughan et al. discloses an uncontrolled blending of a diamine, nadic monoanhydride and a dianhydride in no preferred order or reaction conditions. The polyamide-acid precursor or precursor of a polyimide prepolymer product is of uncontrolled composition and purity, and is subject to variation resulting from different mixing procedures storage, and preparation of fiber reinforced prepreg materials.

U.S. Pat. No. 3,708,459 to Lubowitz discloses an uncontrolled first reaction of diamine and the monofunctional anhydride (NA), followed by the addition of the difunctional dianhydride The reaction conditions are uncontrolled and no steps are taken to limit the formation of undesired byproducts or to control product purity or molecular weight distribution.

An improved synthesis for polyimides has now been discovered, which significantly improves the physical properties and uniformity of PM matrix composite materials. There are unexpected enhancements in storage stability, processability and performance. A more closely controlled molecular weight distribution, and the ability to produce an MDA-free version of the resin system ar additional advantages.

SUMMARY OF THE INVENTION

The present invention provides an improved synthesis for high temperature polyimides known as PMR. The synthesis of the present invention may be used, for example, to prepare an improved PMR-15 polyimide. It is a particular advantage of the improved synthesis of the present invention that exposure to MDA is reduced as recommended by the OSHA proposal mentioned above.

The chemistry of the PMR-15 condensation reaction has in the past been generally represented by the following equations. These equations ar not intended to imply separate interactions between the three ingredients, which may interact simultaneously. The abbreviations used in the equations are now more fully described. As used herein, nadic refers to 5-norbornene-2,3-dicarboxylic compounds. For example, nadic acid refers to 5-norbornene-2,3-dicarboxylic acid and nadic ester (NE) refers to the monomethyl ester of 5-norbornene-2,3-dicarboxylic acid.

NA = Anhydride of 5-norbornene-2,3-dicarboxylic acid

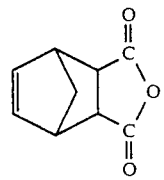

NE = Monomethyl Ester of 5-norbornene-2,3-dicarboxylic acid

-continued

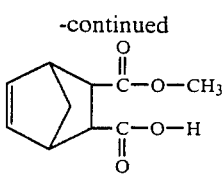

MDA = Methylene Dianiline

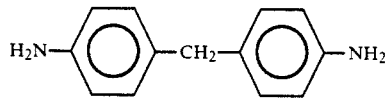

BTDE = Benzophenone Tetracarboxylic Acid, Dimethyl Ester

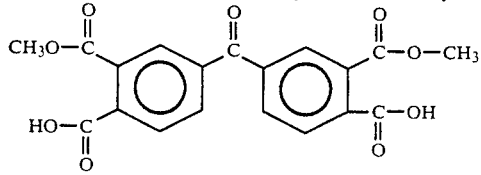

BTDA = Anhydride of Benzophenone Tetracarboxylic Acid

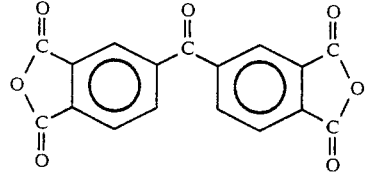

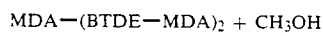

MDA—(BTDE—MDA)₂ + CH₃OH

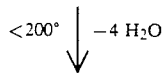

MDA—(BTDE—MDA)₂
(Polyimide)

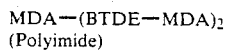

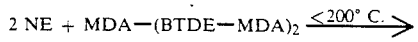

NE—MDA(BTDE—MDA)₂—NE + 2 CH₃OH
(Polyamic Acid)

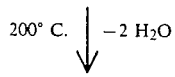

NE—MDA(BTDE—MDA)₂—NE
(Polyimide Prepolymer)

It has now been discovered that the above-described chemistry is not correct. Surprisingly, it has been discovered that a small amount of volatile materials are released in the temperature range of about 200° to 315° C., even though the condensation reaction should be complete at 200° C. As mentioned above, a thermal transition centered near 340° C. is associated with an addition cross-linking reaction. It is this release of volatiles at or near the cross-linking reaction temperature that is now believed to cause processing problems during cure and/or postcure. These high temperature volatiles have now been identified, and an improved synthesis to avoid their formation is described below.

Compared to the prior preparations of PMR polyimides, polyimides prepared by the present invention provide the following advantages: longer shelf life, increased resin flow, higher glass transistion temperature, increased heat resistance, reduced laminate microcracking, reduced volatile release at or near cross-linking temperature, longer room temperature shelf life and longer debulking time. The term "debulking time" refers to the debulking process. For thick parts (about 15 to 50 plies), it is common practice to layup a few plies, perhaps four, bag, and apply pressure and modest heat, generally about 79 to 90° C. This process compacts the layup and helps prevent the formation of wrinkles and resin rich areas. Since it is repeated several times, the initial plies are subjected to several thermal cycles, and their ability to retain their utility under these conditions is a desirable characteristic.

DETAILED DESCRIPTION OF THE INVENTION

A more accurate description of the chemistry of the preparation of high temperature PMR polyimides is now presented. The above description approximately defines the beginning and end of the condensation reaction. A more representative reaction sequence is set forth below.

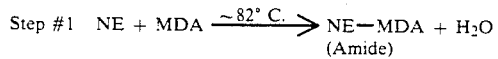

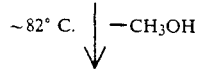

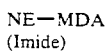

This reaction occurs over a wide temperature range, from about −20° C. to over 82° C.

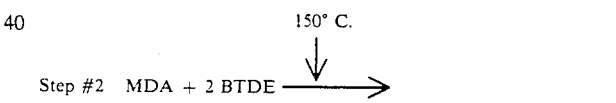

BTDE—MDA—BTDE + 2 H₂O
(Amide)

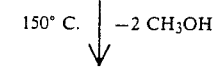

BTDE—MDA—BTDE
(Imide)

NE—MDA(BTDE—MDA)₂—NE + 2 H₂O
(Amide)

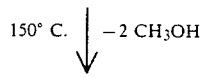

NE—MDA(BTDE—MDA)₂—NE
(Polyimide Prepolymer)

The reaction sequence set forth above more correctly reflects the chemical reactions. Neither this sequence, nor the one previously described, accounts for the surprising fact that a small amount (about 2 to 3%) of volatile components (water and methanol) are released in the temperature range from 200° to 315° C. even though the condensation reactions should be complete at 200° C. It has now been discovered that it is this unexpected release of volatiles near or at the crosslinking temperature that causes problems during cure and/or postcure.

In the more accurate second reaction sequence, it is seen that in the first step the amine (methylene dianiline) reacts with the nadic ester (the monomethyl ester of 5-norbornene-2,3-dicarboxylic acid).

This second reaction may be represented:

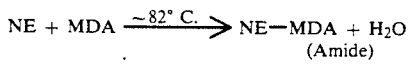

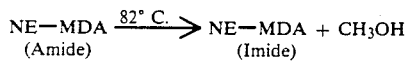

A secondary reaction has been discovered in addition to the above:

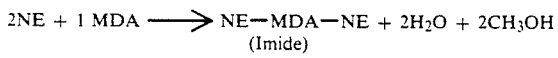

The concentration of this secondary product is low in fresh prepolymer, but gradually increases with time. It has been found that typical times for significant buildup of this product in polyimide prepolymer are:
- −18° C.—about 2 years
- 4° C.—about 1 year
- 20° C.—about 30 days
- 82° C.—about 10 minutes While not wishing to be bound by any theory, it is believed that there are three basic reasons why the presence of increasing concentrations of NE-MDA-NE result in increasing processing problems and probable degradation of physical properties of the cured resin. They are:
1. NE-MDA-NE is converted, at the crosslinking temperature (288° C.) to a BMI-type resin, and remains as an adulterant in the cured system. The brittle characteristics of the BMI-type systems are well documented.
2. Since NE-MDA-NE formation is an irreversable reaction, its formation consumes MDA which otherwise would be used to form the amide molecule needed to produce the desired molecular weight of 1500. This loss of MDA reduces the mole ratio of MDA/BTDE from the desired value of 3.087/2.087 to a lower value, hence increasing the molecular weight. Increased molecular weight reduces flow in the intermediate temperature range, thus complicating the timely expulsion of volatile materials.
3. The irreversable consumption of NE removes from the reaction system end cap units which control molecular weight build up and also are essential to the proper crosslinking reaction. Also, lack of end cap units can result in unendcapped BTDE-MDA units, which will continue to cure by a condensation reaction, with the continued release of methanol and water.

It is an important aspect of the present invention to carry out, prior to resin formulation, a reaction between NE and MDA to form the desired NE-MDA dimer and to suppress formation of the undesired NE-MDA-NE trimer. In the practice of the present invention it is advantageous to purify the NE-MDA dimer produced by the reaction of NE and MDA to remove NE-MDA-NE trimer. In order to suppress trimer formation, an excess of the MDA should be used, and the NE should be added slowly to the MDA, to maintain a large excess of MDA. When the reaction is complete, the product is purified by suspension in hot 1N hydrochloric acid, and hot filtration. The trimer is insoluble, because it does not have a free amine group, and is removed by filtration of the hot suspension. The free amine group on the desired product, NE-MDA, is converted to the hydrochloride salt, which is soluble in hot hydrochloric acid, but crystallizes out on cooling to room temperature. The excess MDA forms a dihydrochloride salt, which is soluble in cold hydrochloric acid. The desired product is filtered off from the cooled down filtrate, washed to remove excess MDA, suspended in water, and treated with dilute alkali (for example, sodium hydroxide, sodium carbonate, etc.) to convert to the free amine. The excess MDA can be recovered by treatment of the cold filtrate with alkali, which regenerates the free base. The amount of excess MDA used depends on an economic trade-off of how much trimer must be discarded compared to the cost of recovering and reusing the excess MDA.

Another important aspect of this invention is that the second step of the reaction sequence, the synthesis of the corresponding BTDE-MDA and BTDE-MDA-BTDE imide products, present unexpected characteristics not shared by the NE-MDA material. Both the dimer and trimer imides have been synthesized, but their high melting points and limited solubilites in ordinary solvents render them difficult to use for resin formulation. In order to resolve this problem it has been discovered that stopping the synthetic procedure at its first stage, that is the amic acid configuration shown below

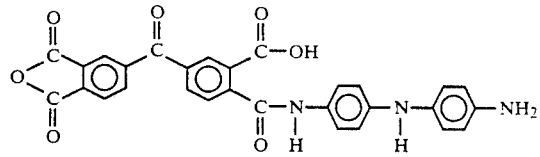

enhances solubility, and reduces the melting points, hence makes the product more amenable to resin formulation.

A second consideration, for this portion of the process of the present invention, is that unlike the NE-MDA synthesis, the bis adduct (trimer) is not an undesirable byproduct, but is a desired step in the sequential build-up of the desired polymer chain. Hence, the most direct procedure is to carry out the reaction as follows: 4 BTDA+2 MDA→BTDA-MDA-BTDA+BTDA-MDA+BTDA. The exact ratio of reaction products has not been determined. However, it is believed that the trimer is the main product. From a resin formulation standpoint, the trimer is the most desired product.

A complete reaction sequence is set forth below.

Step #1  NE + MDA 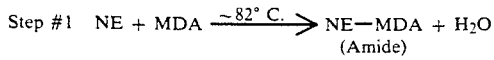 NE—MDA + H₂O
(Amide)

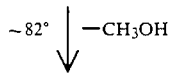

NE—MDA
(Imide)

This reaction occurs over a wide temperature range, from about −20° C. to over 82° C.

Step #2  4 BTDA + 2 MDA 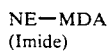

BTDA—MDA—BTDA + BTDA—MDA + BTDA
(Amic acid mixture)

Step #3  2 NE—MDA +

1 BTDA—MDA—BTDA + BTDA—MDA + BTDA 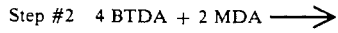
(Amic acid mixture)

Polyimide
Prepolymer

As used herein an amic acid mixture refers to a mixture of BTDA+MDA reaction products, (BTDA-MDA dimer+BTDA-MDA-BTDA trimer) both in the amic acid as shown in the above configuration, plus any unreacted BTDA. Such a product will be soluble in dilute alkaline solutions, and certain organic solutions, such as TMF, NMP, etc.

The reaction of BTDA and MDA proceeds easily. While a number of reaction conditions of solids, solvents and temperatures are possible, the preferred conditions are:

Solids—10-25%
Solvents—THF, DMAC, NMP

As used herein THF is an abbreviation for tetrahydrofuran (also called oxacyclopentane), DMAC is an abbreviation for dimethylacetamide, and NMP is an abbreviation for N-methyl pyrrolidone.

Temperature—0° C. to 75° C. with the upper limit set below that at which imidization might occur. The temperature at which imidization occurs will depend on the particular system, type and amount of solvent, and the time of exposure. Since imidization leads to insolubility, the amount of imide present must be controlled.

Reactant Ratio—BTDA/MDA=2/1

The reaction is carried out in a one liter resin kettle equipped with mechanical agitation, thermometer and temperature control, dropping funnel, nitrogen purge, and reflux condenser. An ice bath was used to regulate temperature in the initial phases of the reaction to control an exotherm. An I²R controller was used to control temperatures above room temperature.

The reaction of BTDA and MDA is carried out as follows:
1. One mole of a solution of MDA in a suitable solvent is slowly added to two moles of BTDA (anhydride), in a suitable solvent. The reaction mixture is cooled, to compensate for the mild exotherm.
2. After addition is complete, the product may be heated to up to 75° C., in order to complete the reaction. Temperatures in excess of 75° C. are undesired, since an undesired imidization reaction may be initiated.
3. The soluble reaction product is poured into a large volume of 1N HCl, which precipitates out a yellow solid, which is filtered, washed, and dried, to produce a fine yellow powder, soluble in NH₄OH, and tetrahydrofurane.

Analysis of the product reveals that it is a mixture of unreacted BTDA (anhydride or acid) plus BTDA-MDA and BTDA-MDA-BTDA, both in the amic acid form. It should be understood that from the standpoint of resin formulation it does not matter that the reaction product is a mixture. As long as the correct starting ratio of 2 moles of BTDA to 1 mole of MDA is used, and there is no preferential loss of any of the components, the product is suitable for resin formulation. Based on the molecular weight ratios, the proper weight ratios, for resin formulation of a 1500 M.W. prepolymer are as follows:

1.29 gms NE-MDA+1 gm BTDA-MDA amic acid mixture

For prepreg manufacture, these two components are solvent blended, using tetrahydrofuran, and that resin solution used to make products, etc. in accordance with previously defined procedures. These products can be used to make various laminated parts by primarily defined procedures.

An alternate procedure, which has certain economic advantages, is to use the amic acid mixture in the reaction solvent, without precipitation, to form a solvent blend in this procedure, the NE-MDA solid reaction product is dissolved in the amic acid mixture, and the resulting solvent blend used to produce the prepreg material. When this alternative is used, tetrahydrofuran is a preferred solvent, because of its low boiling point. However, prepreg so produced tends to be dry and nonpliable, and subject to loss of resin during handling. This problem can be overcome by adding a small amount (about 25% of the total solvent volume) of ethanol. This will result in a soft, pliable prepreg, better suited to the lay up of contoured panels.

For the solvent blend procedure the weight percent of amic acid mixture in the solvent blend must be determined. In this procedure the correct formulation weight ratios for a 1500 MW prepolymer are as follows.

1.224 gms NE-MDA+1,000 gms BTDA-MDA amic acid mixture

In order that those skilled in the art may better understand how the present invention may be practiced, the following examples are given by way of illustration, and not by way of limitation. All parts and percentages are by weight, unless otherwise noted.

EXAMPLE 1

| | NE | + | MDA | → | NE-MDA | + | CH₃OH | + | H₂O |
|---|---|---|---|---|---|---|---|---|---|
| M.W. | 196 | | 198 | | 344 | | 32 | | 18 |
| Moles | 0.8 | | 1.6 | | 0.8 | | 0.8 | | 0.8 |
| Grams | 157 | | 317 | | 275 | | 26 | | 14 |

MDA 317 gms + 120 ml C₂H₅OH
NE 157 gms + 200 ml C₂H₅OH
Deionized Water H₂O 4000 ml
Concentrated HCl 500 ml
NaOH ≈ 200 gms

PROCEDURE

1. Put 317 gms MDA in reaction flask, and add 120 ml EtOH. Heat to bath temperature of 85-90° C.
2. Suspend 157 gms NE in 200 ml EtOH, and allow solid to settle. Decant solution into addition funnel.
3. Add NE solution, at fast drop rate, to MDA-EtOH solution. Slowly distill off EtOH, as NE is added. Collect distillate, and use it to continue to dissolve balance of NE, by resuspension and decanting.
4. When addition of NE is complete (2-3 hours), reflux for 4 hours, slowly distilling off about ⅔ of the EtOH solvent.
5. Pour reaction product into beaker, and allow to cool overnight. The product will solidify, to a brown granular moist solid.
6. Divide product approximately in half, and treat each half as described below.
7. Heat 2,000 ml DI H₂O to about 50-60° C., and add half of reaction product. Stir to break up clumps, and slowly pour in 250 ml CON HCl. Heat suspension to 100° C. At this point the NE·MDA·HCl and the excess MDA dihydrochloride are soluble, the NE₂MDA is an insoluble suspension of very small particle size.
8. Using a heated (or preheated) suction funnel, slowly pour about ¼ of suspension into funnel, applying only slight vacuum in filter flask. Cover funnel with watch glass, to limit cool down. Apply suction only to maintain moderate filtration rate. Excessive suction will cause hot solution to boil, which cools it down too rapidly, causing crystallization in the pores of the filter, and blockage.
9. Continue hot filtration until suspension is used up.
10. Allow hot filtrate to cool overnight.
11. Filter off crystals of NE·MDA·HCl, and wash thoroughly by suspension (3 times) in water, and refiltration.
12. Suspend crystals in water, and stir in 10-15% solution of NaOH, until product is alkaline.
13. Filter off white powder, and wash 3 times with water, by resuspension and refiltration.
14. Dry solid overnight in a warm vacuum oven. Record weight and yield. Submit sample to lab for HPLC analysis.
15. The soluble fraction from Step #11 contains the excess MDA, which is recovered by addition of NaOH solution until the suspension is alkaline. Filter off, wash, dry, and store the solid MDA.

EXAMPLE 2

The procedure described above was repeated using 5-norbornene-2,3-dicarboxylic anhydride in place of the monomethyl ester of 5-norbornene-2,3-dicarboxylic acid. The only change in the procedure is that the anhydride is added slowly, as a dry powder, to the refluxing MDA-alcohol solution. This change is made because the anhydride is only slightly soluble in cold ethanol. Comparable results are obtained using the anhydride.

The NE-MDA dimer is then reacted to produce a polyimide prepolymer. For example, to prepare a PMR-15 polyimide the NE-MDA dimer may be reacted as follows:

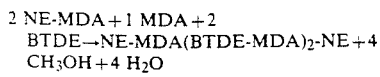

The nadic-methylene dianiline dimers according to the present invention may be used to prepare a number of polyimide products in addition to PMR-15. An advantage of these dimers is that the toxicity of free methylen dianiline is significantly reduced. Examples of other polyimide products which may be prepared according to the present invention using nadic-methylene dianiline dimers:

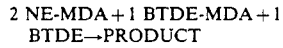

These two examples provide a final product essentially identical to the usual PMR system, but contain MDA only in the pre-reacted form, where its toxicity is greatly diminished.

This example produces a lower molecular weight prepolymer (1,000 versus 1,500), hence is similar to the usual PMR formulation, but contains no unreacted MDA.

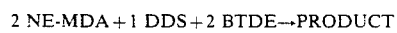

This formation replaces one third of the MDA with a less-toxic substitute, diaminodiphenyl sulfone (DDS). The prepolymer so produced differs from the standard formulation only in that the middle of the chain contains one sulfone group (—SO₂—) in place of a methylene group (—CH₂—). The physical properties of the sulfone containing product are similar to the usual PMR formulation, but its toxicity is greatly reduced.

EXAMPLE 3

| Materials Summary | | | |
|---|---|---|---|
| | BTDA | + MDA | → BTDA-MDA-BTDA + BTDA-MDA + BTDA |
| M.W. | 322.2 | 198.3 | |
| moles | 0.54 | 0.27 | |
| Grams | 175.4 | 53.9 | |
| | MDA 53.9 gms + 250 ml (234 g) DMAC | | |
| | BDTA 175.4 gms + 496 ml (456 g) DMAC | | |
| | 1N HCl 3 l | | |

PROCEDURE

A. Synthesis of BTDA-MDA amic acid mixture
1. Add 175.4g of BTDA followed by 496 ml (465g) of DMAC to a clean one liter resin kettle. Start moderate agitation. BTDA is not completely soluble and a white slurry is obtained.
2. Dissolve MDA (53.9g) in 250 ml (234g) of DMAC. Retain 82 ml (76.8g) of DMAC to rinse makeup vessels and dropping funnel.
3. A slow nitrogen purge is started.
4. Add MDA solution dropwise to the stirred BTDA slurry at a rate of approximately 0.5 mil per minute over 1 hour. The slurry clears with the addition of MDA. The temperature is controlled between 15 to 18° C.
5. Run the reaction in this fashion for two hours. Then slowly raise the temperature to 50° C. and maintain the reaction with agitation in this manner for 24 hours.

6. Cool the reaction and use a vacuum to draw the orange slightly viscous liquor into a storage vessel.
7. Sample and analyze the solution for composition.
8. Obtain a solid product by rapid mechanical agitation and floccing 500 ml portions of the reactive product in 3 liters of 1 N HCl. An easily filterable and water washable particulate solid is obtained.
9. Air dry the material and then dry it at 50° C. in a circulating air oven for 24 hours. A product with a volatile content of 1-2% was obtained. Yield of product after work up is 65 to 75% of theoretical.

If the alternate procedure of using the reaction product in solution, without precipitation of the solid resin, is used, the preferred solvent is tetrahydrofurran. The alternate procedure is the same as the procedure described above, except that steps #7 and #8 are omitted.

Additional products which may be prepared according to the present invention using nadic-methylene dianiline dimers include PMR-30 and PMR-II-30 formulations, both described by R. Vanucci in *PMR Polyimide Compositions for Improved Performance at 371° C.*, published in "SAMPE Quarterly," volume 19, pages 31 to 36 (1987), incorporated herein by reference. Still other products which may be prepared according to the present invention using nadic-methylene dianiline dimers include the LARC-13 formulation, described by A. St. Clair et al., Polymer Engineering and Science, volume 22, pages 9 to 14 (1982), and the LARC-160 formulation, described by P. Young et al., in *Resins for Aerospace,* pages 479-490, American Chemical Society Symposium Series, No. 132 (1980), both of which are incorporated herein by reference.

It is understood that various other modifications will be apparent to and can readily be made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A process for the preparation of a polyimide prepolymer, comprising:
    reacting a nadic compound selected from the group consisting of nadic acid, a monomethyl ester of nadic acid, and nadic anhydride, with methylene dianiline to form a reaction product consisting essentially of a nadic-methylene dianiline dimer, and
    reacting said dimer with benzophenone tetracarboxylic acid dianhydride amic acid mixture to form a polyimide prepolymer.
2. The process set forth in claim 1 wherein said nadic compound is a monomethyl ester of 5-norbornene-2,3-dicarboxylic acid.
3. The process set forth in claim 2 wherein said dimer formed by the reaction of monomethyl ester of 5-norbornene -2,3-dicarboxylic acid and methylene dianiline is an amide.
4. The process set forth in claim 3 wherein said amide further reacts to form an imide.
5. The process set forth in claim 2, wherein said benzophenone tetracarboxylic acid dianhydride methylene dianiline amic acid mixture is a mixture of unreacted benzophenone tetracarboxylic acid or anhydride plus BTDA-MDA amic acid dimer and BTDA-MDA-BTD amic acid trimer.
6. The process set forth in claim 5 wherein said benzophenone tetracarboxylic acid dianhydride methylene dianiline amic acid mixture is essentially in the trimer configuration.
7. The process set forth in claim 6 wherein said trimer further reacts to form a polyimide prepolymer.
8. The process set forth in claim 1 wherein said nadic compound is 5-norbornene-2,3-dicarboxylic anhydride.
9. The process set forth in claim 8 wherein said dimer formed by the reaction of 5-norbornene-2, 3-dicarboxylic anhydride and methylene dianiline is an amide.
10. The process set forth in claim 9 wherein said amide further reacts to form an imide.
11. The process set forth in claim 8 wherein said benzophenone tetracarboxylic acid dianhydride methylene dianiline amic acid mixture is a mixture of unreacted benzophenone tetracarboxylic acid or anhydride plus BTDA-MDA amic acid dimer and BTDA-MDA-BTDA amic acid trimer, where the unreacted acidic groups are in either the anhydride or diacid configuration.
12. A process for the preparation of a polyimide prepolymer, comprising:
    reacting a nadic compound selected from the group consisting of nadic acid, a monomethyl ester of nadic acid, and nadic anhydride, with methylene dianiline to form a reaction product consisting essentially of a nadic-methylene dianiline dimer,
    reacting benzophenone tetracarboxylic acid dianhydride with methylene dianiline to form an amic acid mixture comprising consisting of unreacted BTDA plus a BTDA-MDA amic acid dimer and BTDA-MDA-BTDA amic acid trimer, or a product which is essentially the trimer, and
    reacting said nadic-methylene dianiline dimer and said amic acid mixture to form a polyimide prepolymer.
13. The process set forth in claim 12 wherein said nadic compound is a monomethyl ester of 5-norbornene-2,3-dicarboxylic acid.
14. The process set forth in claim 13 wherein said dimer formed by the reaction of monomethyl ester of 5-norbornene-2,3-dicarboxylic acid and methylene dianiline is an amide.
15. The process set forth in claim 14 wherein said amide further reacts to form an imide.

* * * * *